United States Patent [19]
Carlton et al.

[11] Patent Number: 5,377,242
[45] Date of Patent: Dec. 27, 1994

[54] METHOD AND SYSTEM FOR EMERGENCY CORE COOLING

[75] Inventors: James D. Carlton, Lynchburg; Edward R. Kane, Forest; Martin V. Parece, Lynchburg, all of Va.

[73] Assignee: B&W Nuclear Service Company, Lynchburg, Va.

[21] Appl. No.: 151,453

[22] Filed: Nov. 15, 1993

[51] Int. Cl.$^5$ .............................................. G21C 15/18
[52] U.S. Cl. .................. 376/282; 376/283; 376/292
[58] Field of Search ............... 376/204, 282, 283, 292, 376/294, 352

[56] References Cited

U.S. PATENT DOCUMENTS

| | | | |
|---|---|---|---|
| 4,061,535 | 12/1977 | Nolan et al. | 376/283 |
| 4,071,403 | 1/1978 | Andrews et al. | 376/281 |
| 5,000,907 | 3/1991 | Chevereau et al. | 376/282 |
| 5,135,708 | 8/1992 | Carlton et al. | 376/282 |

*Primary Examiner*—Daniel D. Wasil
*Attorney, Agent, or Firm*—Robert J. Edwards; D. Neil LaHaye

[57] ABSTRACT

A nuclear reactor and emergency core cooling system. A nuclear reactor is provided with a cylinder around the core barrel that defines an annular channel therebetween. An injection nozzle is provided through the reactor vessel for delivery of emergency coolant to the defined channel. Emergency coolant is supplied during a LOCA to the injection nozzles sequentially from a high pressure tank, a low pressure tank, gravity feed tanks inside the reactor building, and from sumps that collect coolant in the reactor building. Check valves in the upper portion of the cylinder vent steam to the reactor inlet lines during a LOCA. Bores around the upper circumference of the cylinder break any siphoning action that might occur at the injection nozzle if there is a break in the emergency coolant lines from the emergency coolant sources.

1 Claim, 5 Drawing Sheets

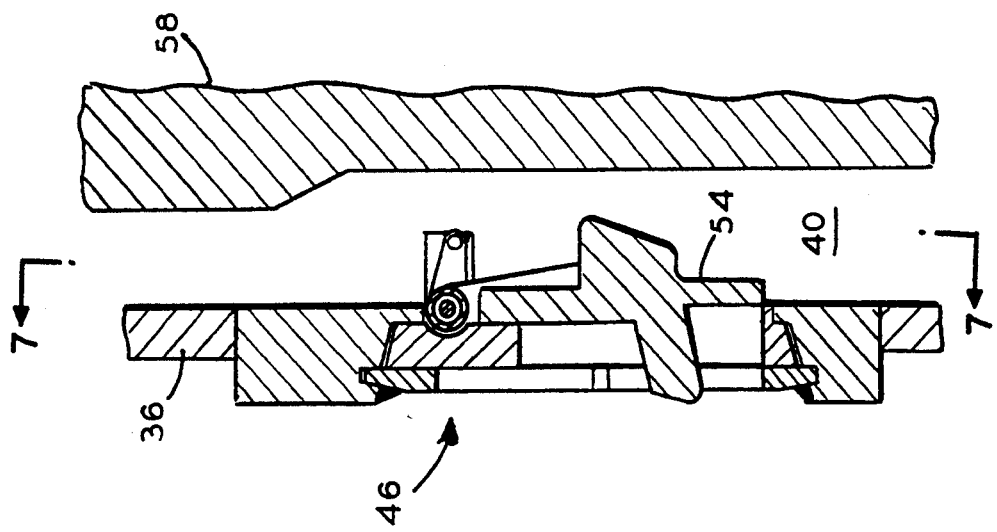
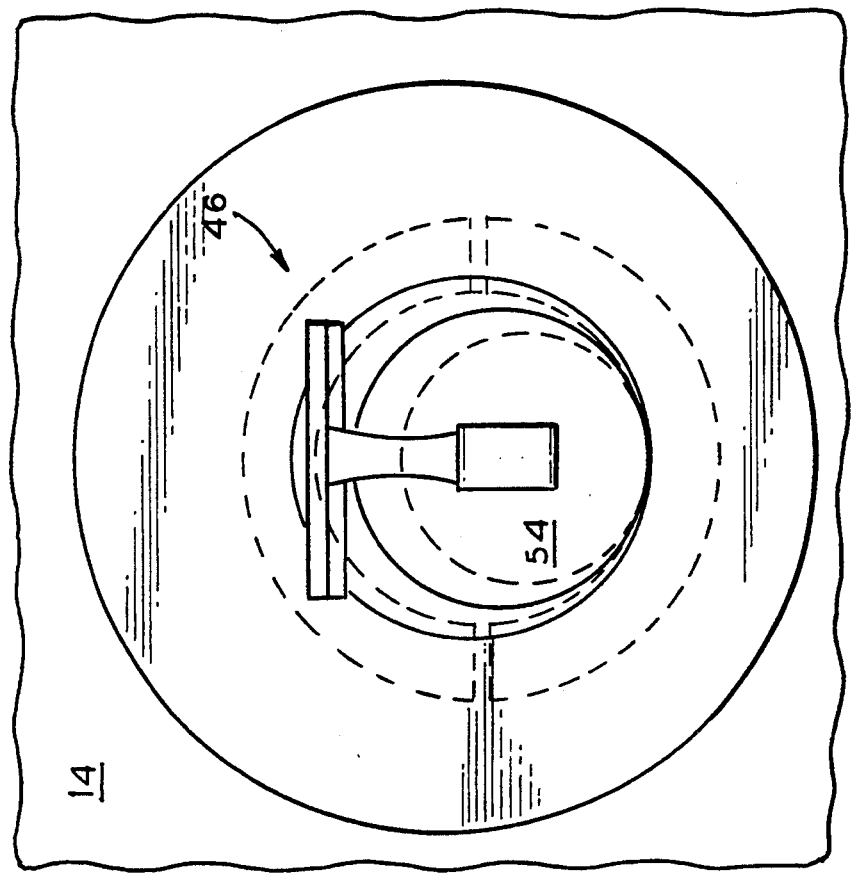

METHOD AND SYSTEM FOR EMERGENCY CORE COOLING

BACKGROUND OF THE INVENTION

1. Field of the Invention

The invention is related to nuclear reactor coolant systems and particularly to the supply of emergency coolant to the nuclear reactor core during a loss of coolant accident.

2. General Background

In the nuclear power industry, nuclear reactors must be designed so as to withstand a variety of postulated accidents. Probably the most traumatic, if not most important, potential accident to be avoided is a loss of coolant accident (LOCA) involving the nuclear reactor. This occurs when there is a breach in the cooling system causing a drop in pressure along with a loss of coolant. As can be imagined, without any coolant in the reactor core, the core will overheat, potentially causing severe damage not only to the structure but also to the surrounding environment.

The principal method of mitigating such an accident is to flood the reactor with coolant. This must occur as soon as possible after the cooling system loses pressure in order to absorb the heat that builds up in the core during the LOCA. This usually involves adjacent storage tanks of emergency coolant that are coupled to the reactor piping. In some cases these tanks are under pressure and in others, pumps are provided to deliver the coolant to the reactor. This emergency coolant is injected into the reactor piping in any of several locations such as hot leg piping, cold leg piping, through the wall near the top of the reactor vessel, or by piping arrangements to the plenum area above the reactor core. However, one major drawback of tying into the reactor piping is the possibility that the break will prevent the fluid from reaching the reactor core. Another drawback of existing designs is that early in the LOCA, flashing in the lower vessel prevents normal coolant already in the vessel from reaching the core. A third drawback is that steam produced in the core acts to prevent additional emergency coolant from reaching the core.

Typically, during a LOCA, the core flood tanks of a nuclear reactor are designed to deliver emergency coolant to the reactor vessel. However, for nuclear power plants currently in operation, this occurs well in time into the LOCA, thus "flashing" throughout the reactor vessel will occur prior to the introduction of the emergency coolant. "Flashing" is a term generally used to describe the vaporization of hot pressurized liquid when it is rapidly depressurized. This occurs in a nuclear reactor when as the result of the rupture of the normal coolant piping, normal cooling fluid is exposed to significantly reduced pressure as normal coolant is expelled out the rupture. Depending on temperature and pressure, such flashing and loss of normal coolant fluid can occur within a matter of seconds.

It is important to deliver emergency coolant to the reactor as quickly as possible to minimize any core temperature increases that occurs whenever flashing and boiling in the core occurs. It is vitally important to supply emergency coolant to the core inlet after such rapid de-pressurization so as to continue coolant flow to the core thus minimizing or eliminating core temperature increases. It is also the intent of emergency coolant to prevent or minimize the occurrence of flashing from depleting the normal coolant fluid already residing in the reactor vessel lower plenum and downcomer.

In view of the present state of the art, there is a need for an improved means for emergency core cooling of a nuclear reactor during a LOCA.

SUMMARY OF THE INVENTION

The present invention addresses the above need in a straightforward manner. What is provided is a method and system for the supply of emergency coolant sequentially from different passive and active sources and that does not use the core cooling piping used during normal reactor operations. A high pressure tank first provides emergency coolant to the reactor core. A low pressure tank begins providing emergency coolant to the reactor core shortly before the high pressure tank empties. A gravity feed tank that is inside the nuclear reactor building begins providing emergency coolant to the reactor core shortly before the low pressure tank empties. As the gravity feed tank empties, coolant collected by a sump in the reactor building is pumped into the reactor core. The reactor vessel is provided with one or more emergency coolant injection nozzles at an elevation above the top of the core. The reactor vessel is also provided with a channel along the outside of the core barrel that directs emergency coolant to the bottom of the core. Check valves, siphon breakers, and flow restrictions may also be provided to quickly vent steam in the event of flashing and to minimize leakage of coolant present in the reactor. Automatically actuated system depressurization valves are located on the pressurizer or in each hot leg of the reactor coolant system and/or on the steam piping of each steam generator to help reduce the system pressure to a value sufficiently low so that emergency coolant flow from the gravity drain tank to the reactor coolant system can occur.

It is an object of the invention to provide a means for delivering emergency coolant to and removing heat from the reactor core in a manner that minimizes or eliminates core temperature increases during a LOCA. Another object of the invention is to provide a means for delivery that will not interfere with or utilize the normal core cooling piping required for operation. A further object of this invention is to provide a means for delivering emergency coolant in such a timed manner so as to prevent flashing of existing coolant that is still available for core cooling.

BRIEF DESCRIPTION OF THE DRAWINGS

For a further understanding of the nature and objects of the present invention, reference should be had to the following description, taken in conjunction with the accompanying drawings in which like parts are given like reference numerals, and wherein:

FIG. 6 is a side sectional view illustrating a check valve in the nuclear reactor.

FIG. 7 is a view taken along lines 7—7 in FIG. 6.

DETAILED DESCRIPTION OF THE PREFERRED EMBODIMENT

Figure 1:
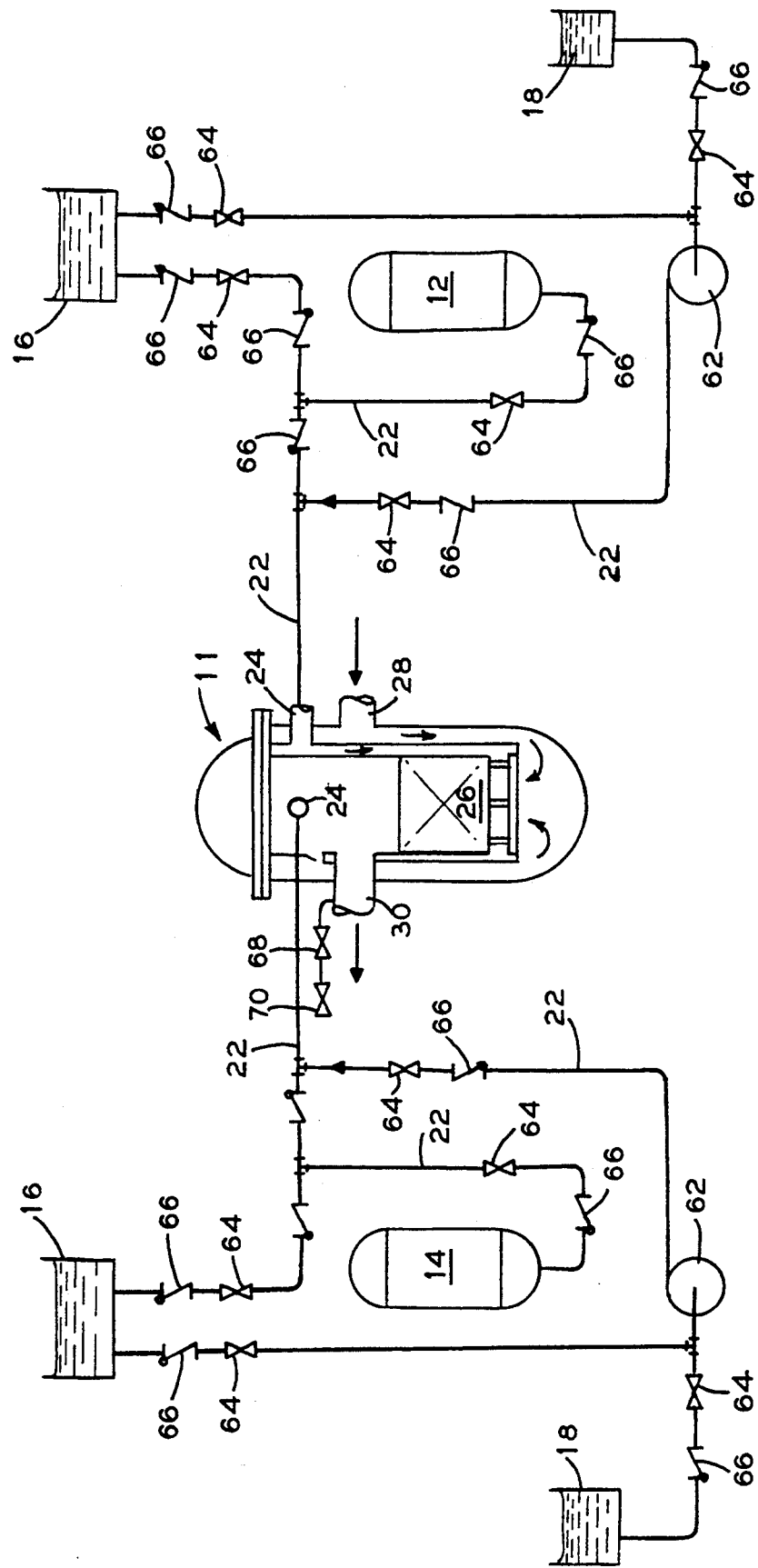
FIG. 1 is a schematic view of the invention.

The invention is generally indicated in FIG. 1 as gravity feed tanks 16, sump 18, and passive means 66 (piping check valves) for causing sequential passive delivery of emergency coolant to reactor 11 from tanks 12–16 and active delivery of emergency coolant from sump 18 to the reactor 11 by the motor driven pumps 62. Motor operated isolation valves 64 are normally fully open when the reactor is at operating temperature and pressure, and piping check valves 66 provide isolation of tanks 12–18 from the reactor coolant system.

Figure 2:
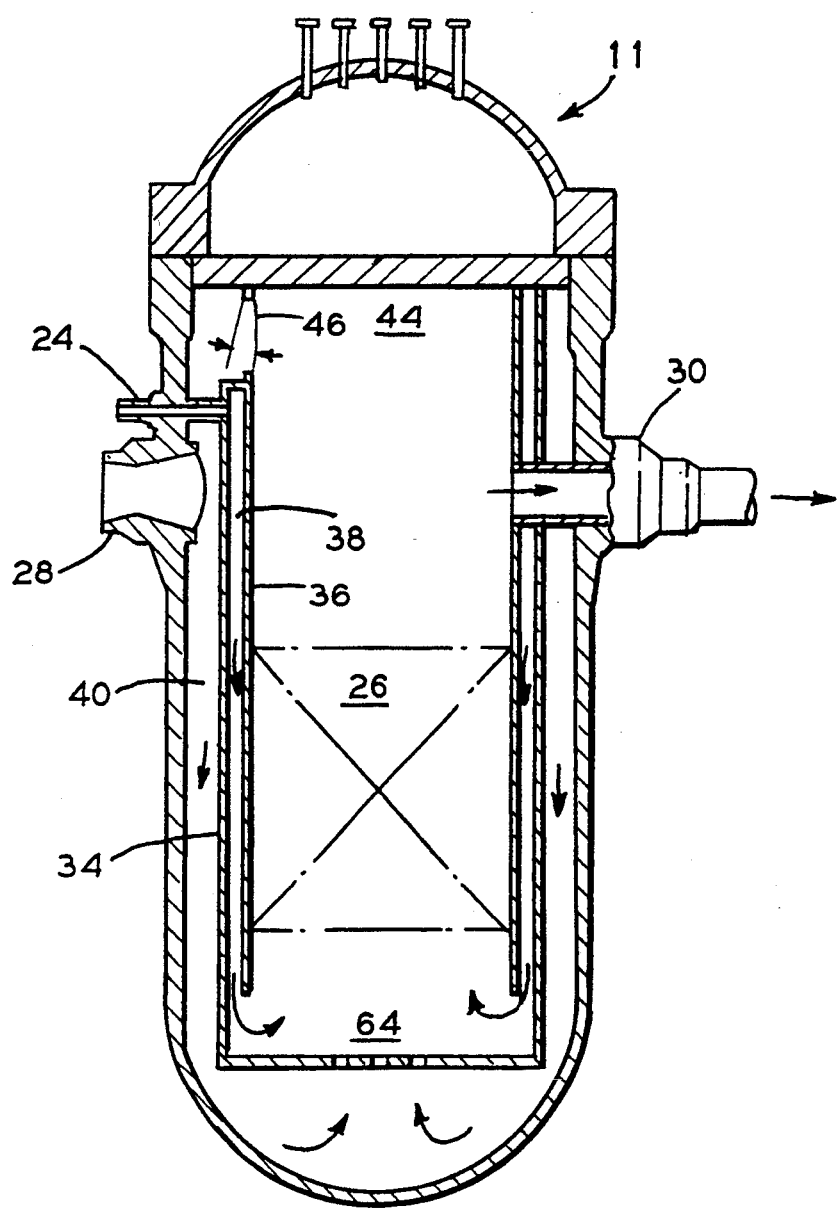
FIG. 2 is a rotated, partial sectional view of the nuclear reactor used in the invention.
Figure 3:
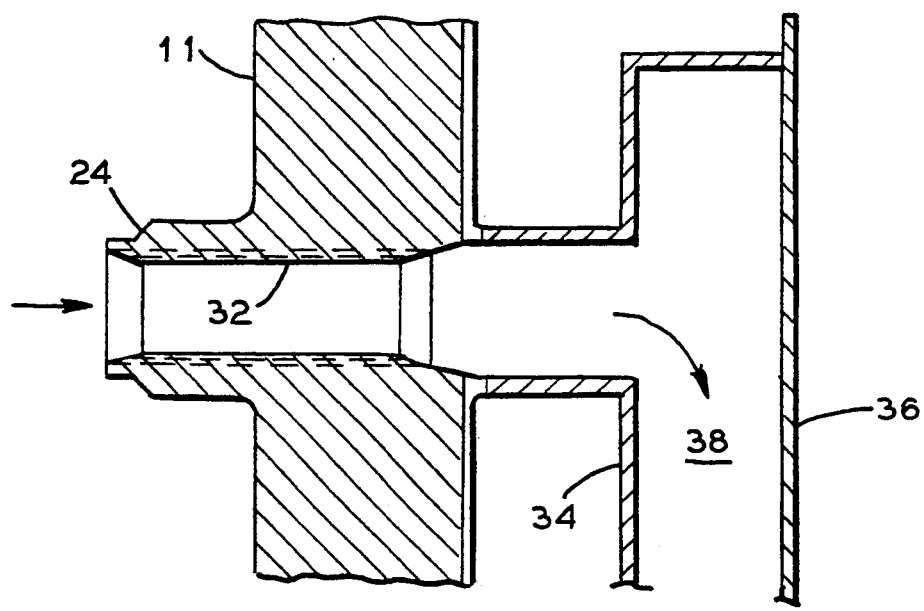
FIG. 3 is a detailed sectional view that illustrates the emergency coolant injection nozzle in the nuclear reactor.

Nuclear reactor 11 is provided with features directed specifically to receiving emergency coolant during a LOCA. Coolant from the various tanks and sump is delivered through emergency coolant lines 22 to injection nozzles 24 on nuclear reactor 11. Coolant lines 22 and injection nozzles 24 put tanks 12–16 and sump 18 in fluid communication with nuclear reactor 11 and are specifically directed to the delivery of coolant during a LOCA. This eliminates the disadvantages of attempting to deliver emergency coolant through normal operation coolant lines when the LOCA is due to a break in the normal operation coolant lines. Injection nozzles 24 provide the entry point into nuclear reactor 11 for emergency coolant. Four nozzles 24 are provided in the preferred embodiment but the actual number is also dependent upon reactor size and design. As best seen in FIG. 2, each nozzle 24 is located at an elevation above the top of reactor core 26. Nozzle 24 is illustrated as being above cold leg piping inlet 28 and hot leg piping exit 30 but could be below these inlets and outlets as long as it is above core 26. Each injection nozzle 24 is provided with a smooth flow restriction orifice 32 indicated in FIG. 3. The narrowed orifice reduces flow area so that in the event of a LOCA caused by a failure in emergency coolant lines 22, leak flow is minimized.

Figure 5:
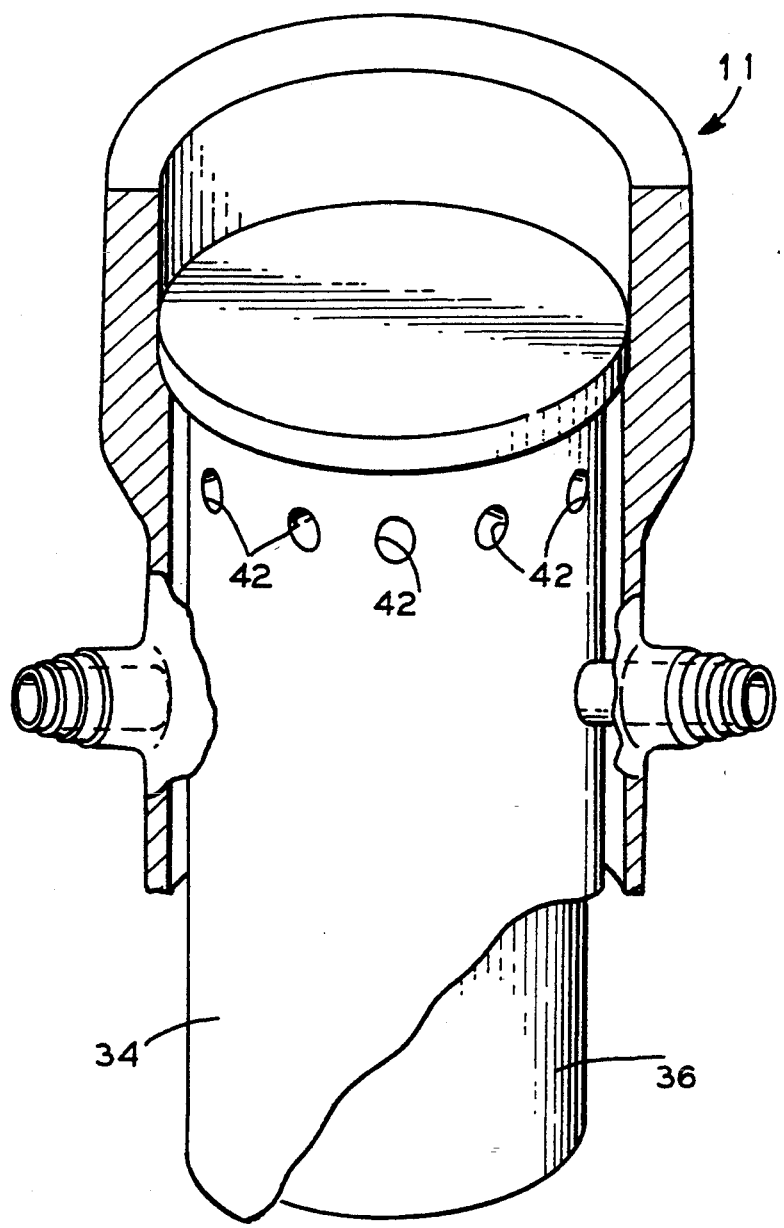
FIG. 5 is a partial sectional view of the interior of the nuclear reactor.

Circular cylinder 34, seen in FIG. 2 and 5, is positioned around core barrel 36. This forms annular channel 38 in downcomer 40 which is in fluid communication with each nozzle 24. In this construction, emergency coolant supplied through nozzle 24 flows down channel 38 along the outside of core barrel 36. This helps reduce the risk of losing emergency coolant before it reaches core 26 if the LOCA is due to a break in cold leg piping 28 or hot leg piping 30. Cylinder 34 may be provided with a series of bores 42 around its upper circumference that act as siphon breakers in the event of a break or leak in injection nozzle 24 or emergency coolant lines 22.

When a LOCA results from a break in cold leg piping inlet 28 or cold leg supply lines, flashing can occur within a matter of seconds. The steam produced in the core 26 which passes to the reactor vessel upper plenum 44 can create difficulties in delivering emergency coolant to core 26. Reactor internals check valves 46, illustrated schematically in FIG. 2 and in FIG. 6 and 7, provide for quick removal of the steam from upper plenum 44 and core 26 to enhance the delivery of emergency coolant to core 26. The internals check valves 46 are mounted on the core barrel 36 with the disc 54 in the normally closed position. During postulated Loss of Coolant Accidents, a pressure difference is created across the disc 54, causing the disc to open and create a flow path from the core 26 to the upper plenum 44 through the check valves 54 and into the reactor vessel downcomer 40. From downcomer 40, fluid flowing through the check valve 54 can flow directly to the cold leg 28 break. This direct path quickly removes steam from the upper plenum and the core and enhances emergency coolant delivery to the core.

Figure 4:
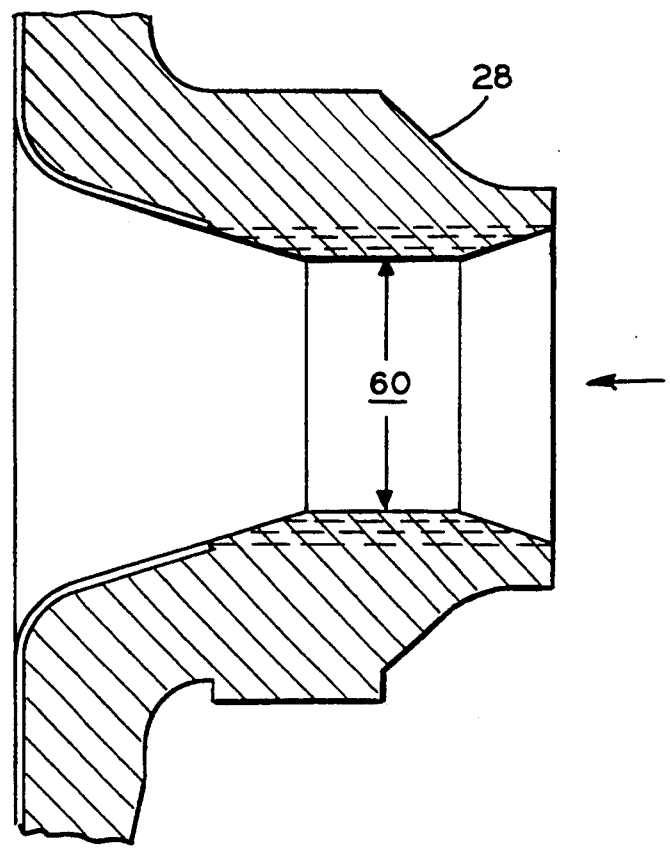
FIG. 4 is a detailed sectional view that illustrates the cold leg nozzle in the nuclear reactor.

FIG. 4 illustrates another feature that may be included in nuclear reactor 11 to reduce the rate of loss of reactor coolant following a LOCA. Each cold leg piping inlet 28 may be provided with flow restriction 60, a narrowed section, that should not affect normal operations.

Referring to FIG. 1, high pressure tank 12 is a pressure vessel designed to supply coolant to nuclear reactor 11 in a passive manner. This is accomplished by pressurizing tank 12 to a high pressure with an inert gas such as nitrogen. High pressure tank 12 delivers coolant through emergency coolant lines 22 to one or more of injections nozzles 24. In the invention, high pressure tank 12 is the first source of emergency coolant since the high pressure provides for rapid coolant injection to the core during the critical first seconds during a LOCA. It is important that the high pressure core flood tank be designed so as to deliver emergency coolant to the core inlet and downcomer before or near the time flashing in these areas occur. Further, the design must contain sufficient emergency coolant volume so that the low pressure core flow tank will actuate before or near to the time that the high pressure core flood tank empties to insure a continuous supply of emergency coolant.

The second source of emergency coolant in the invention is low pressure tank 14. Tank 14 is similar to tank 12 in that it is a pressure vessel containing emergency coolant that is also pressurized by an inert gas. Tank 14 may be kept at a lower pressure than tank 12 due to the less critical need for rapid coolant delivery by the time that coolant delivery from tank 14 is initiated. Tank 14 delivers coolant to one or more injection nozzles 24 through emergency coolant lines 22, with the initiation of delivery from tank 14 beginning shortly before tank 12 empties to prevent a break in the flow of emergency coolant. The low pressure core flood tank is designed such that either the gravity feed tank or pumped injection is actuated before the low pressure core flood tank empties.

The third source of emergency coolant, from which delivery is initiated shortly before tank 14 empties, is one or more gravity feed tanks 16. Gravity feed tanks 16 deliver emergency coolant to one or more injection nozzles 24 through emergency coolant lines 22. In the prior art, feed tanks that are used to store and deliver emergency coolant by pumped injection to a nuclear reactor are generally referred to as borated water storage tanks and are located outside the building that houses the nuclear reactor. In the invention, gravity feed tanks 16 are internal to the reactor building. In order to help insure that the reactor coolant system pressure decreases to a value sufficiently low so that emergency coolant will flow from the gravity tank 16 to the system, automatic depressurization valves 68, 70 are installed on each reactor system hot leg 30 or on the pressurizer. The depressurization system consists of an isolation valve 68 and depressurization valve 70. Valves 68 and 70 can be remote manually operated by the plant operators from the control room, or valves 68 and 70 can be automatically operated by redundant safety grade reactor system pressure signals.

The next source of emergency coolant is one or more sumps 18 in the reactor building that collect any primary or emergency coolant that has leaked into the reactor building. Pumps 62 deliver coolant collected by sumps 18 to one or more injection nozzles 24 through emergency coolant lines 22.

During reactor operation, piping check valves 66 provide isolation of the tanks 12–18 from the reactor coolant system 11. As the reactor coolant system pressure decreases following a reactor pipe break, the pressure in tanks 12–16 becomes higher than that of the reactor coolant system with the result that emergency coolant flows from the tanks 12–16 to the bottom of the core 26 via emergency coolant piping 22, open isolation valves 64 and the one way piping check valves 66, piping 22, injection nozzle 24, and injection channel 38. Because of flashing and boiling in the core 26, steam is produced and passes to the upper plenum region 44. For a LOCA resulting from a large or small break in cold leg pipe 28, reactor internals check valves 46 (FIGS. 2,6,7) are provided to create a quick opening direct path from upper plenum region 44 to the break in cold leg 28. This direct path quickly removes steam from the upper plenum 44 and core 26 and enhances emergency coolant delivery to the core for all LOCAs. Shortly before high pressure tank 12 empties, the reactor coolant pressure decreases to a value below the pressure of low pressure tank 14 resulting in flow from the low pressure tank to the bottom of the core by way of injection piping 22, reactor nozzle 24, and core barrel injection path 38. Shortly before low pressure tank 14 empties, the reactor coolant pressure has further decreased to a value below that of the elevated gravity flow tank 16 resulting in additional passive emergency coolant flow to the reactor core inlet 64 by way of the emergency coolant injection flow path described above. The initial water inventory of the reactor coolant system and the injected emergency coolant from tanks 12–16 collects in the reactor building sump(s) 18. If and when the gravity flow tanks 16 become empty (hours after event initiation) the pumps 62 may be actuated to deliver emergency coolant from the sumps 18 to the core inlet 26 through the emergency coolant flow path previously described.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A nuclear reactor including a reactor vessel with a plurality of coolant inlets and outlets and having a core barrel inside the reactor vessel, wherein the improvement comprises:
   a. a cylinder positioned inside the reactor vessel around the core barrel to define an annular channel between the core barrel and cylinder, said cylinder being provided with a plurality of bores therethrough spaced around its upper circumference;
   b. a check valve provided in the upper portion of said cylinder;
   c. an injection nozzle through the reactor vessel in fluid communication with the channel defined between the core barrel and said cylinder, said injection nozzle being provided with a flow restriction orifice; and
   d. a flow restriction orifice being provided in the coolant inlets in the reactor vessel.

* * * * *